(12) United States Patent
Tachibana et al.

(10) Patent No.: US 8,151,148 B2
(45) Date of Patent: Apr. 3, 2012

(54) CONNECTION MONITORING METHOD, CONNECTION MONITORING APPARATUS, AND CONNECTION MONITORING SYSTEM

(75) Inventors: Ikuko Tachibana, Kawasaki (JP);
Yoshihiro Kimura, Kawasaki (JP);
Toshiaki Hayashi, Kawasaki (JP);
Takashi Tanifuji, Kawasaki (JP);
Yasutaka Tanikawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 308 days.

(21) Appl. No.: 12/385,211

(22) Filed: Apr. 1, 2009

(65) Prior Publication Data

US 2009/0300438 A1 Dec. 3, 2009

(30) Foreign Application Priority Data

Jun. 2, 2008 (JP) ................................ 2008-144114

(51) Int. Cl.
*G09F 11/00* (2006.01)

(52) U.S. Cl. ........... 714/57; 714/37; 714/38.1; 709/227; 709/204; 370/252; 370/428

(58) Field of Classification Search .................... 714/37, 714/57; 709/227; 370/252, 428
See application file for complete search history.

(56) References Cited

U.S. PATENT DOCUMENTS

| | | | | |
|---|---|---|---|---|
| 4,817,080 A | * | 3/1989 | Soha | 370/252 |
| 4,943,963 A | * | 7/1990 | Waechter et al. | 370/428 |
| 5,179,695 A | * | 1/1993 | Derr et al. | 714/31 |
| 5,491,791 A | * | 2/1996 | Glowny et al. | 714/37 |
| 5,938,729 A | * | 8/1999 | Cote et al. | 709/224 |
| 6,023,507 A | * | 2/2000 | Wookey | 709/224 |
| 6,493,446 B1 | * | 12/2002 | Cherry | 379/265.05 |
| 6,625,648 B1 | * | 9/2003 | Schwaller et al. | 709/224 |
| 2001/0018673 A1 | * | 8/2001 | Goldband et al. | 705/27 |
| 2005/0120370 A1 | * | 6/2005 | Behbehani | 725/45 |

FOREIGN PATENT DOCUMENTS

EP 1768031 A1 * 3/2007
JP 7-56770 3/1995

* cited by examiner

*Primary Examiner* — Robert Beausoliel, Jr.
*Assistant Examiner* — Jeison C Arcos
(74) *Attorney, Agent, or Firm* — Staas & Halsey LLP

(57) ABSTRACT

A connection monitoring apparatus determines whether the connection monitoring apparatus is communicatively connected to the customer apparatus at a regular connection time. When the connection monitoring apparatus is not communicatively connected to the customer apparatus at the regular connection time and the present time falls within the support contract time of a customer, the connection monitoring apparatus issues a connection fault notification. When the connection monitoring apparatus is not communicatively connected to the customer apparatus at the regular connection time and the present time does not fall within the support contract time of the customer, the connection monitoring apparatus suppresses the connection fault notification from being issued and issues the connection fault notification at the next support contract time of the customer.

5 Claims, 17 Drawing Sheets

FIG.2

| NO | CUSTOMER INFORMATION |
|---|---|
| 1 | CUSTOMER NAME |
| 2 | MANAGER NAME |
| 3 | MANAGER'S MAIL ADDRESS |
| 4 | MANAGER'S CONTACT INFORMATION |

FIG.3

| NO | CONNECTION INFORMATION |
|---|---|
| 1 | SMTP SERVER NAME |
| 2 | SENDER MAIL ADDRESS |
| 3 | REGULAR CONNECTION SCHEDULE |

FIG.4

| NO | CUSTOMER INFORMATION |
|---|---|
| 1 | APPARATUS ID |
| 2 | CUSTOMER NAME |
| 3 | MANAGER NAME |
| 4 | MANAGER'S MAIL ADDRESS |
| 5 | MANAGER'S CONTACT INFORMATION |

FIG.5

| NO | CONNECTION INFORMATION |
|---|---|
| 1 | APPARATUS ID |
| 2 | SMTP SERVER NAME |
| 3 | SENDER MAIL ADDRESS |
| 4 | REGULAR CONNECTION SCHEDULE |

FIG.6

| NO | CONTRACT INFORMATION |
|---|---|
| 1 | APPARATUS ID |
| 2 | CUSTOMER NAME |
| 3 | CONTRACT TIME: WEEKDAY 9:00 to 19:00 |

FIG.7

| NO | MONITOR INFORMATION |
|---|---|
| 1 | APPARATUS ID |
| 2 | REGULAR CONNECTION SCHEDULE |
| 3 | REGULAR CONNECTION STATE "1" |
| 4 | MONITOR SUPPRESSION "0" |

FIG.8

| NO | INCIDENT CREATING INFORMATION |
|---|---|
| 1 | APPARATUS ID |
| 2 | DATE AND TIME OF REGULAR CONNECTION TIME-OUT |
| 3 | DELETE FLAG "1" |

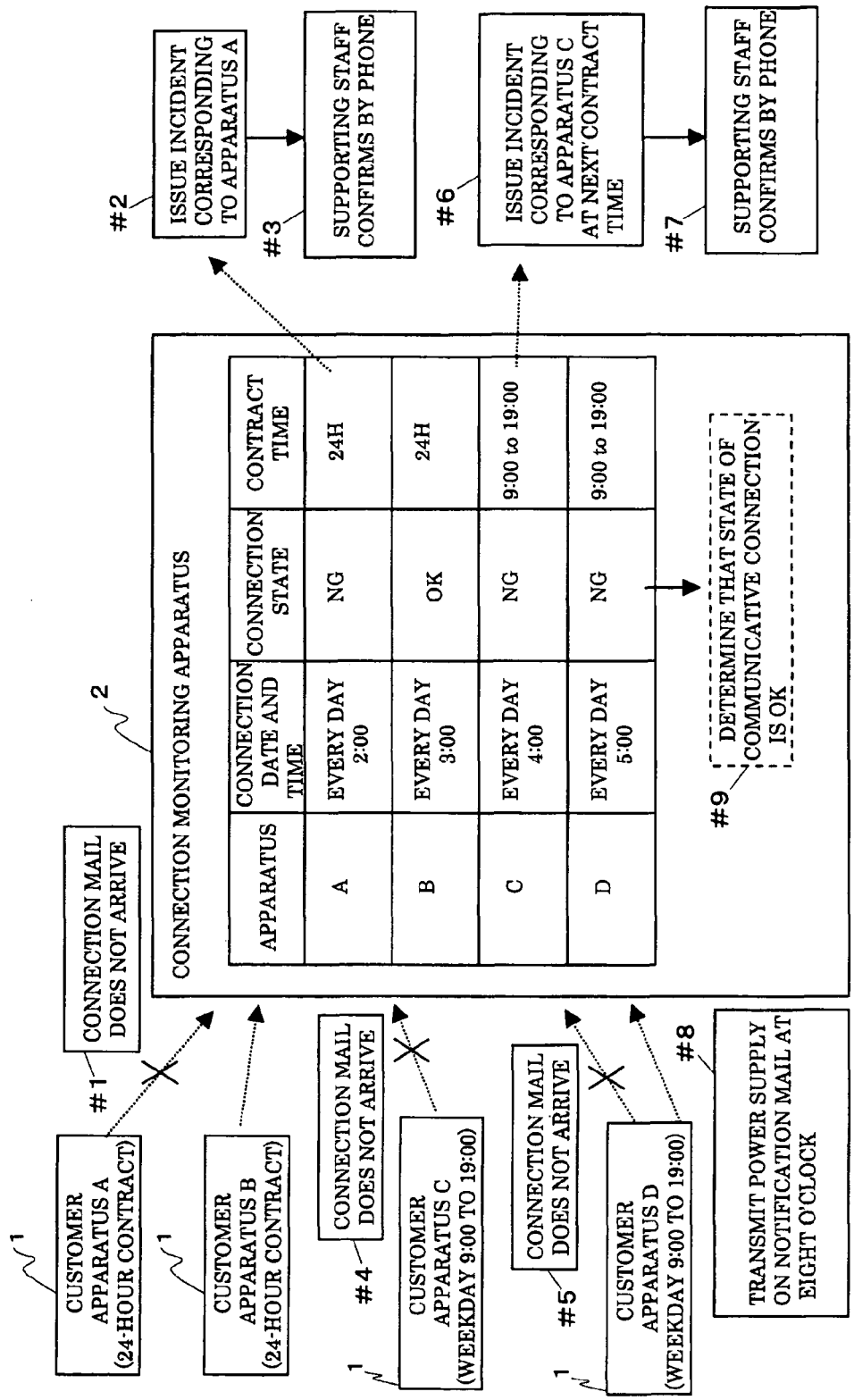

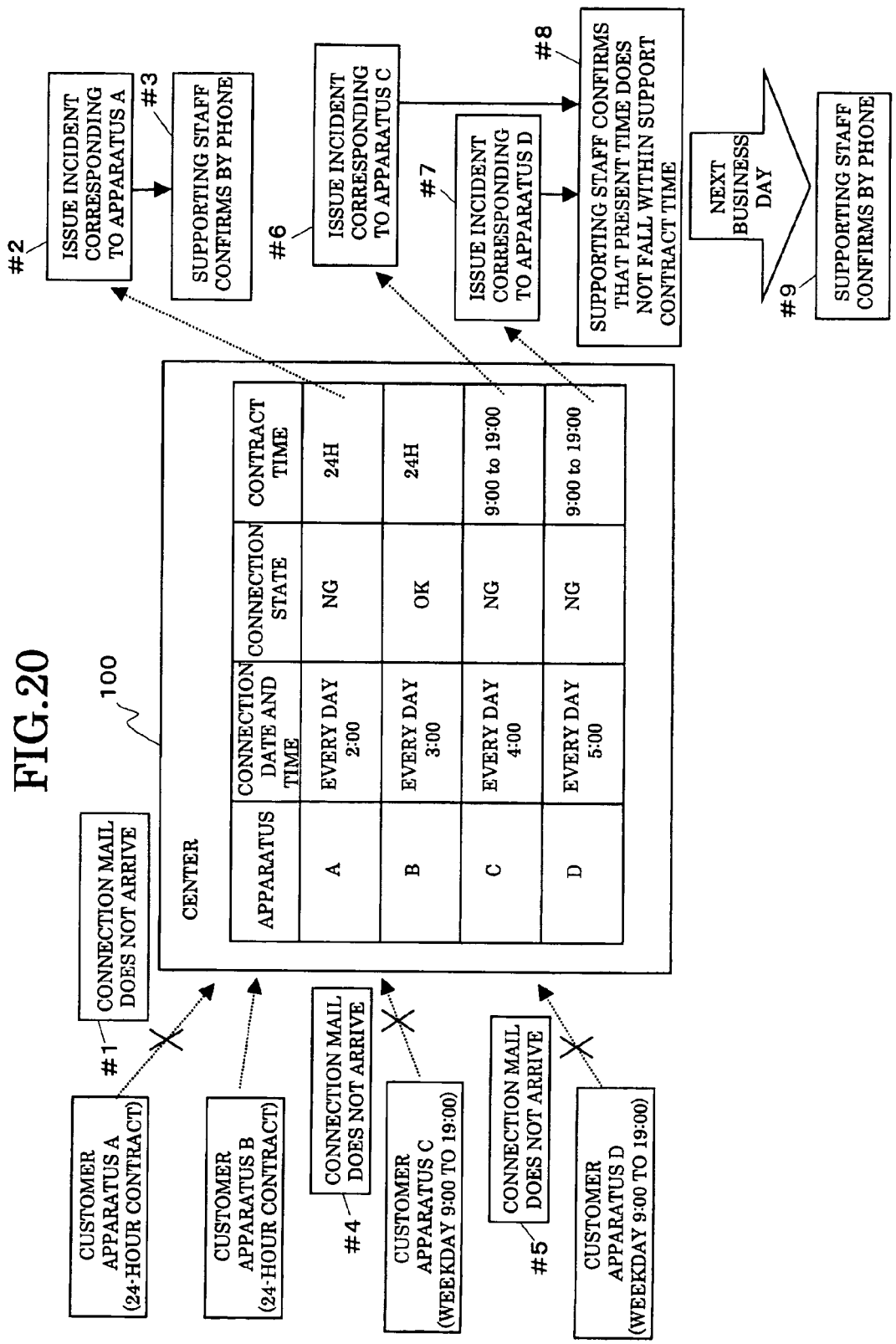

CONNECTION MONITORING METHOD, CONNECTION MONITORING APPARATUS, AND CONNECTION MONITORING SYSTEM

CROSS-REFERENCE TO RELATED APPLICATIONS

This application is based upon and claims the benefit of priority of the prior Japanese Patent Application No. 2008-144114, filed on Jun. 2, 2008, the entire contents of which are incorporated herein by reference.

FIELD

The embodiments discussed herein are related to a connection monitoring method, a connection monitoring apparatus and a connection monitoring system.

BACKGROUND

There has been proposed a user fault monitoring and controlling system which determines whether a fault in a user terminal is detected in an operating time and outputs a fault message as long as the fault is detected in the operating time (for example, refer to Japanese Laid-Open Patent Publication No. 7-56770).

As has been well known, a remote notification service in which a customer apparatus notifies a remote support center (hereinafter, referred to as "center") of hardware and software faults of the customer apparatus which is a processing apparatus used by a customer by an electronic mail and the center reacts the fault of the customer apparatus. In the remote notification service, when the customer apparatus notifies the center of the fault of the customer apparatus, the customer apparatus periodically sends a connection mail to the center to ascertain whether a communication path is established between the customer apparatus and the center and the center receives the connection mail, thereby monitors the communication path.

For example, when a transmission time of the connection mail from the customer apparatus to the center is set to a holiday night, while a system is suspended to perform maintenance of the customer apparatus without respect to the transmission time, the connection mail is not sent from the customer apparatus. Since the connection mail does not arrive at the center in the set transmission time, the center detects a communication connection fault and issues an incident which is a connection fault notification that represents the communication connection fault between the center and the customer apparatus. For example, a supporting staff in the center checks the content of the incident. However, the number of responding staffs is decreased at holiday nights, so that it takes much time for the supporting staff to check the incident one by one. For example, when the supporting time of a contract for the customer apparatus is restricted during weekday daytime hours, the time when the above connection fault is detected does not fall within the time for the contract, so that the supporting staff will respond to the connection fault in business hours on the following day (for example, the supporting staff calls the customer). As a result, responding staffs have to concentrate on responding to the incidents on a day after a holiday (for example, on Monday), causing a problem in that it is difficult for the staffs to quickly respond thereto.

FIG. 20 is a block diagram describing an example of the issuance process of a connection fault notification by the remote notification service, which is studied by inventors and not a prior art, that is not opened and published. The customer apparatus (customer apparatus A to D) are processing apparatus used by the customers. A center 100 holds information on connection date and time, connection state and contract time on a customer apparatus basis. The connection date and time represent a predetermined regular connection time when the customer apparatus sends a connection mail. The connection state represents a state of communicative connection between the customer apparatus and the center 100. The contract time represents a support contract time for the customer apparatus. For example, the regular connection time for the customer apparatus A is two o'clock every day, the regular connection time for the customer apparatus B is three o'clock every day, the regular connection time for the customer apparatus C is four o'clock every day and the regular connection time for the customer apparatus D is five o'clock every day. The support contract time for the customer apparatus A and B is 24 hours. The support contract time for the customer apparatus C and D starts at nine o'clock and ends at nineteen o'clock on weekdays.

The center 100 monitors whether a connection mail arrives from each customer apparatus at the regular connection time. When the center 100 confirms that the connection mail arrives from the customer apparatus at the regular connection time, the center determines that a state of communicative connection between the customer apparatus is OK (the center is communicatively connected to the customer apparatus). When the center confirms that the connection mail does not arrive from the customer apparatus at the regular connection time, the center determines that the state of communicative connection between the customer apparatus is NG (the center is not communicatively connected to the customer apparatus). For example, as illustrated in #1 in FIG. 20, when the connection mail does not arrive from the customer apparatus A at two o'clock being the regular connection time, the center 100 determines that the center 100 is not communicatively connected to the customer apparatus A and issues an incident (or a connection fault notification) corresponding to the customer apparatus A (refer to #2 in FIG. 20). The supporting staff calls the customer of the customer apparatus A based on the content of the incident to confirm the state of the apparatus A (refer to #3 in FIG. 20).

As indicated by #4 and #5 in FIG. 20, when the connection mail does not arrive from the customer apparatus C and D at the regular connection time, the center 100 determines that the center 100 is not communicatively connected to the customer apparatus C and D and issues incidents corresponding to the customer apparatus C and D (refer to #6 and #7 in FIG. 20). The supporting staff confirms based on the content of the incident that the present time (when it was confirmed that the connection mail did not arrive) does not fall within the support contract time (refer to #8 in FIG. 20) and calls the customers corresponding to the customer apparatus C and D on the next business day to confirm the state of the apparatus C and D (refer to #9 in FIG. 20). In the issuance process of the connection fault notification described with reference to FIG. 20, as illustrated in #6 and #7 in FIG. 20, even if the time when it was determined that the center 100 is not communicatively connected to the customer apparatus does not fall within the support contract time for the customer apparatus, the center 100 issues the incident. As a result, the supporting staff needs to confirm the issued incident content outside the support contract time and is burdened with a heavy load.

The present invention has for its object to provide a connection monitoring method of suppressing the issuance of a connection fault notification in the case where the time at which it cannot be confirmed that the center is communicatively connected to the customer apparatus does not fall within the support contract time for the customer.

SUMMARY

According to an aspect of the embodiment, a connection monitoring method is a connection monitoring method in a connection monitoring apparatus for monitoring a communicative connection between the connection monitoring apparatus and a customer apparatus. The connection monitoring method includes determining, in the connection monitoring apparatus, whether the connection monitoring apparatus is communicatively connected to the customer apparatus at a regular connection time, and issuing a connection fault notification when the connection monitoring apparatus is not communicatively connected to the customer apparatus at the regular connection time and the present time falls within the support contract time of a customer, and suppressing, in the connection monitoring apparatus, the connection fault notification from being issued when the connection monitoring apparatus is not communicatively connected to the customer apparatus at the regular connection time and the present time does not fall within the support contract time of the customer, and issuing the connection fault notification at the next support contract time of the customer.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 2 is a diagram illustrating an example of customer information in the management DB of the customer apparatus;

FIG. 3 is a diagram illustrating an example of connection information in the management DB of the customer apparatus;

FIG. 4 is a diagram illustrating an example of customer information in the management DB of the connection monitoring apparatus;

FIG. 5 is a diagram illustrating an example of connection information in the management DB of the connection monitoring apparatus;

FIG. 6 is a diagram illustrating an example of contract information in the management DB of the connection monitoring apparatus;

FIG. 7 is a table illustrating an example of monitor information in the management DB of the connection monitoring apparatus;

FIG. 8 is a table illustrating an example of incident creating information in the incident creating information DB of the connection monitoring apparatus;

FIG. 19 is a block diagram describing a detailed example of the suppression process of issuance of the incident by the connection monitoring system of the present embodiment; and FIG. 20 is a block diagram describing an example of the issuance process of a connection fault notification by the remote notification service.

DESCRIPTION OF EMBODIMENTS

Preferred embodiments of the present invention will be explained with reference to accompanying drawings.

Figure 1:
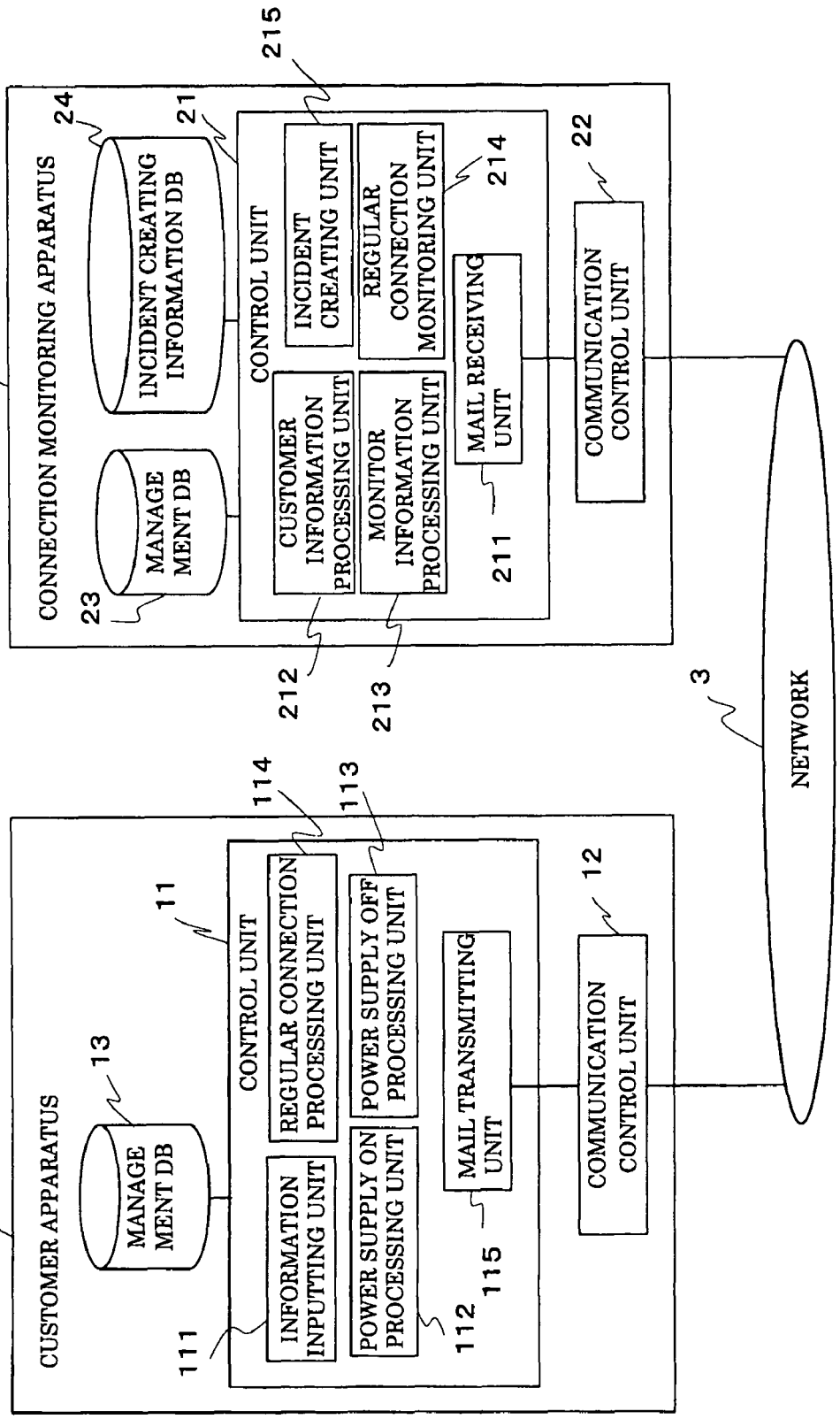
FIG. 1 is a block diagram illustrating an example of a structure of a connection monitoring system of the present embodiment.

The present embodiment is described below with reference to drawings. FIG. 1 is a block diagram illustrating an example of a structure of a connection monitoring system of the present embodiment. The connection monitoring system includes one or a plurality of a customer apparatus 1 and a connection monitoring apparatus 2 for monitoring a communication connection between the customer apparatus 1 and the connection monitoring apparatus 2. The customer apparatus 1 and the connection monitoring apparatus 2 execute communication processing through a network 3 such as the Internet.

The customer apparatus 1 includes a control unit 11, a communication control unit 12 and a management database (DB) 13. The control unit 11 controls processing units of the customer apparatus 1. The communication control unit 12 executes communication process between communication control unit 12 and the connection monitoring apparatus 2 through the network 3. The management DB 13 stores the after-mentioned customer information and connection information.

The control unit 11 includes an information inputting unit 111, a power supply ON processing unit 112, a power supply OFF processing unit 113, a regular connection processing unit 114 and a mail transmitting unit 115. The information inputting unit 111 inputs customer information and connection information according to an input specified by a customer who uses the customer apparatus 1 and stores the customer information and connection information in the management DB 13 to perform a registration notification process. The registration notification process refers to a process for notifying the connection monitoring apparatus 2 of customer information and connection information. The information inputting unit creates a registration notification mail including the customer and the connection information received and an apparatus ID which is identification information of the customer apparatus 1. The power supply ON processing unit 112 turns on the customer apparatus 1 and creates a power supply ON notification mail. The power supply ON notification mail is an electronic mail notifying that the customer apparatus 1 has been turned on. The power supply OFF processing unit 113 turns off the customer apparatus 1 and creates a power supply OFF notification mail. The power supply OFF notification mail is an electronic mail notifying that the customer apparatus 1 has been turned off.

The regular connection processing unit 114 determines whether the present time reaches a regular connection time. When the regular connection processing unit 114 determines that the present time reaches the regular connection time, the regular connection processing unit 114 creates a connection mail. The connection mail is an electronic mail by which the connection monitoring apparatus 2 confirms whether the connection monitoring apparatus 2 is communicatively connected to the customer apparatus 1. The mail transmitting unit 115 transmits the connection mail to the connection monitoring apparatus 2 through the communication control unit 12 and the network 3. In addition, the mail transmitting unit 115 transmits the above-mentioned registration notification mail, power supply ON notification mail, power supply OFF notification mail and connection mail to the connection monitoring apparatus 2.

The connection monitoring apparatus 2 includes a control unit 21, a communication control unit 22, a management DB 23 and an incident creating information database (DB) 24. The control unit 21 controls the processing units of the connection monitoring apparatus 2. The communication control unit 22 executes communication process between the communication control unit 22 and the customer apparatus 1 through the network 3. The management DB 23 stores the after-mentioned customer information, connection information and monitor information. In the management DB 23, contract information is previously stored. In the incident creating information DB 24, incident creating information is stored. The incident creating information indicates whether an incident (a connection fault notification) corresponding to the customer apparatus 1 is issued.

The control unit 21 includes a mail receiving unit 211, a customer information processing unit 212, a monitor information processing unit 213, a regular connection monitoring unit 214 and an incident creating unit 215. The mail receiving unit 211 receives the connection mail, the registration notification mail, the power supply ON notification mail and the power supply OFF notification mail through the network 3 and the communication control unit 22. The customer information processing unit 212 creates customer information based on the registration notification mail and stores the customer information in the management DB 23. The monitor information processing unit 213 creates connection information based on the registration notification mail and stores the connection information in the management DB 23. The monitor information processing unit 213 creates monitor information based on the connection information stored in the management DB 23 and stores the monitor information in the management DB 23. The monitor information includes a regular connection schedule indicating regular connection time corresponding to the customer apparatus and information as to whether to monitor a state where the connection monitoring apparatus 2 is communicatively connected to the customer apparatus 1.

The regular connection monitoring unit 214 executes a regular connection monitoring process. Specifically, the regular connection monitoring unit 214 refers to monitor information in the management DB 23 to confirm the regular connection time corresponding to the customer apparatus 1 and determines whether the connection mail from the customer apparatus 1 has been received at the regular connection time. When the connection mail from the customer apparatus 1 has been received at the regular connection time, the regular connection monitoring unit 214 determines that it is confirmed that the connection monitoring apparatus 2 is communicatively connected to the customer apparatus 1. When the connection mail from the customer apparatus 1 has not been received at the regular connection time, the regular connection monitoring unit 214 determines that the regular connection time is up. In addition, the regular connection monitoring unit 214 refers to the incident creating information DB 24 and determines whether the incident needs to be issued. When the regular connection monitoring unit 214 determines that the incident needs to be issued, the regular connection monitoring unit 214 issues the incident.

The incident creating unit 215 creates incident creating information and stores the incident creating information in the incident creating information DB 24. Specifically, when the regular connection monitoring unit 214 determines that the regular connection time is up, the incident creating unit 215 determines whether the present time falls within the customer support contract time for the customer apparatus 1. When the incident creating unit 215 determines that the present time falls within the customer support contract time for the customer apparatus 1, the regular connection monitoring unit 214 issues the incident and notifies the supporting staff. When the present time does not fall within the customer support contract time for the customer apparatus 1, the incident creating unit 215 creates incident creating information and instructs the regular connection monitoring unit 214 to suppress the issuance of the incident until the next customer support contract time. The instructed regular connection monitoring unit 214 issues the incident at the starting time of the next customer support contract time and notifies the supporting staff in the connection monitoring apparatus 2.

When the mail receiving unit 211 receives any of the registration notification mail, connection mail, power supply ON notification mail and power supply OFF notification mail from the customer apparatus 1 by the next support contract time, the regular connection monitoring unit 214 determines that it is confirmed that the connection monitoring apparatus 2 is communicatively connected to the customer apparatus 1 and does not issue the incident. This reduces the number of incidents to be issued, solving the problem that the supporting staff has to concentrate on responding to the incidents.

The processes of the processing units in the connection monitoring apparatus 2 are realized by a CPU being omitted from illustration and a program being executed thereon. The program can be stored in a computer-readable recording medium and provided with the program recorded in the recording medium or supplied by transmission and reception using a network through a communication interface.

FIG. 2 is a diagram illustrating an example of customer information in the management DB of the customer apparatus. The customer information includes data items such as a customer name, a manager name, a manager's mail address and manager's contact information. The customer name represents the name of a customer, the manager name represents the name of a manager of the customer apparatus 1, the manager's mail address represents the address of an electronic mail of the manager and the manager's contact information represents the phone number of the manager and the like. Incidentally, the customer information may include a customer ID being identification information of the customer instead of the customer name.

FIG. 3 is a table illustrating an example of connection information in the management DB of the customer apparatus. The connection information includes data items such as a Simple Mail Transfer Protocol (SMTP) server name, a sender mail address and a regular connection schedule. The SMTP server name represents the name of a SMTP server (omitted from illustration) used by the customer apparatus 1 to transmit an electronic mail. The sender mail address represents the electronic mail address of a sender of the electronic mail. The regular connection schedule represents predetermined time and date (regular connection time) when the connection mail is transmitted from the customer apparatus 1. When the regular connection time is a predetermined time of every day, a regular connection time being "xx o'clock xx minute," for example, is set to the regular connection schedule. When the regular connection time is a predetermined time of a specific day of every week, a regular connection time being "x day of the week xx o'clock xx minute," for example, is set to the regular connection schedule.

FIG. 4 is a diagram illustrating an example of customer information in the management DB of the connection monitoring apparatus. The customer information includes data items such as an apparatus ID, a customer name, a manager name, a manager's mail address and manager's contact information. The apparatus ID represents the identification information of the customer apparatus 1. The customer name, the manager name, the manager's mail address and the manager's contact information are the same as the customer name, the manager name, the manager's mail address and the manager's contact information respectively in the management DB of the customer apparatus 1 described above with reference to FIG. 2. The customer information processing unit 212 adds the apparatus ID included in the registration notification mail to the customer information included in the registration notification mail to create customer information shown in FIG. 4 and stores the customer information in the management DB 23.

FIG. 5 is a diagram illustrating an example of connection information in the management DB of the connection monitoring apparatus. The connection information includes data items such as an apparatus ID, an SMTP server name, a sender mail address and a regular connection schedule. The apparatus ID represents the identification information of the customer apparatus 1. The SMTP server name, the sender mail address and the regular connection schedule are the same as the SMTP server name, the sender mail address and the regular connection schedule respectively included in connection information in the management DB 13 of the customer apparatus 1 described above with reference to FIG. 3. The monitor information processing unit 213 adds the apparatus ID to the connection information included in the registration notification mail to create connection information shown in FIG. 5 and stores the connection information in the management DB 23.

FIG. 6 is a diagram illustrating an example of contract information in the management DB of the connection monitoring apparatus. The contract information includes data items such as an apparatus ID, a customer name and contract time. The apparatus ID represents the identification information of the customer apparatus 1. The customer name represents the name of a customer. The contract time represents customer support contract time. Information is previously set to the contract time, such as day of the week, for example, weekday, Saturday, Sunday and national holiday and starting time and ending time of the support contract time. Incidentally, when the support contract time is 24 hours, for example, "00:00" is set instead of the starting time and the ending time.

FIG. 7 is a diagram illustrating an example of monitor information in the management DB of the connection monitoring apparatus. The monitor information includes data items such as an apparatus ID, a regular connection schedule, a regular connection state and monitor suppression. The apparatus ID represents the identification information of the customer apparatus 1. The regular connection schedule is a regular connection schedule included in the connection information described above with reference to FIG. 5. The regular connection state represents information indicating the state of connection between the connection monitoring apparatus 2 and the customer apparatus 1. For example, "1" set to the regular connection state represents that the connection monitoring apparatus 2 is normally and communicatively connected to the customer apparatus 1 (or, it is confirmed that the connection monitoring apparatus 2 is communicatively connected to the customer apparatus 1). On the other hand, "2" set to the regular connection state represents that the regular connection monitoring unit 214 determines that the regular connection time is up. Incidentally, when the state where the connection monitoring apparatus 2 is communicatively connected to the customer apparatus 1 is an initial state, "0" is set to the regular connection state. The monitor suppression is information representing whether to monitor the state where the connection monitoring apparatus 2 is communicatively connected to the customer apparatus 1. For example, "0" set to the monitor suppression represents that the state is monitored where the connection monitoring apparatus 2 is communicatively connected to the customer apparatus 1. On the other hand, "1" set to the monitor suppression represents that the state is not monitored where the connection monitoring apparatus 2 is communicatively connected to the customer apparatus 1.

FIG. 8 is a diagram illustrating an example of incident creating information in the incident creating information DB of the connection monitoring apparatus. The incident creating information includes data items such as an apparatus ID, a date and time of regular connection time-out, and a delete flag. The apparatus ID represents the identification information of the customer apparatus 1. The date and time of regular connection time-out represents date and time when the regular connection monitoring unit 214 determines that the regular connection time is up. The delete flag indicates whether to issue the incident corresponding to the customer apparatus 1 shown by the apparatus ID. For example, "0" set to the delete flag indicates the issuance of the incident corresponding to the customer apparatus 1. On the other hand, "1" set to the delete flag indicates that the incident corresponding to the customer apparatus 1 is not issued.

Figure 9:
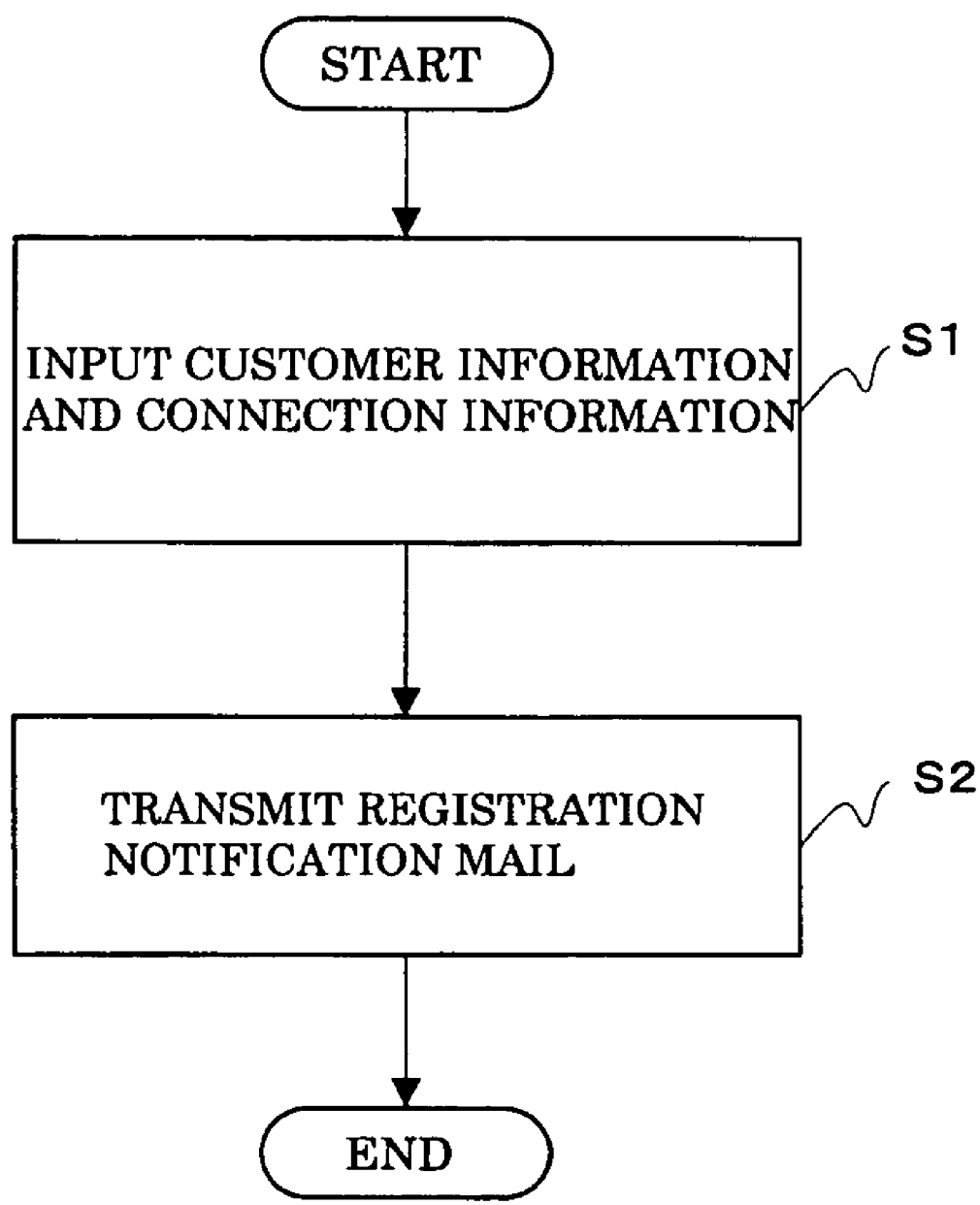
FIG. 9 is an example of a flow chart for transmission process of the registration notification mail.
Figure 10:
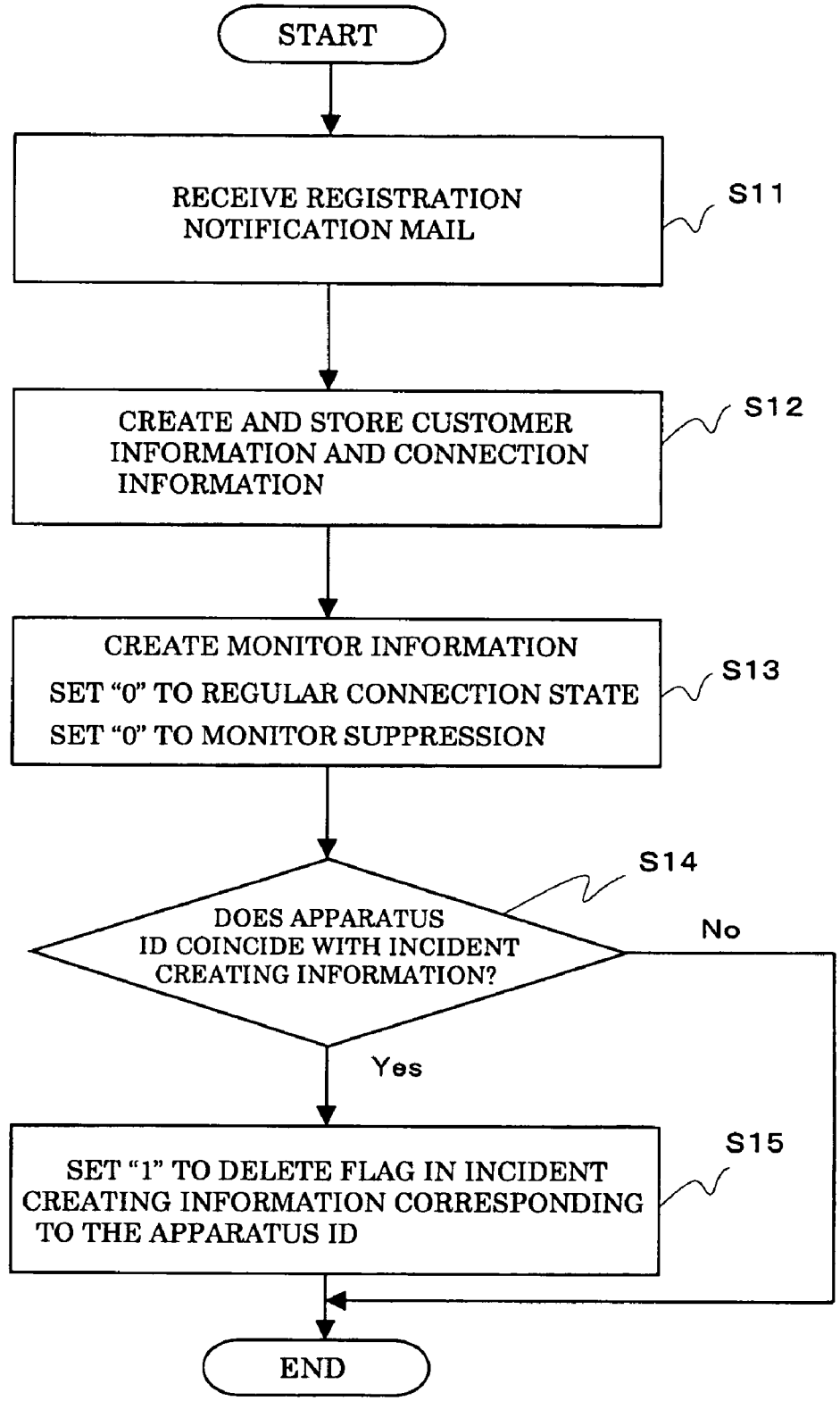
FIG. 10 is an example of a flow chart for suppressing the issuance of an incident.

Referring to FIGS. 9 and 10, there is described below an example of the registration process of customer information and connection information executed by the connection monitoring system of the present embodiment. FIG. 9 is an example of a flow chart for transmission process of the registration notification mail by the customer apparatus.

At step S1, the information inputting unit 111 of the customer apparatus 1 receives customer information and connection information according to an input specified by a customer (step S1) and creates a registration notification mail including the customer and the connection information and the apparatus ID of the customer apparatus 1. The mail transmitting unit 115 transmits the registration notification mail to the connection monitoring apparatus 2 (step S2).

FIG. 10 is an example of a flow chart for suppressing the issuance of an incident in the connection monitoring apparatus in the case where the registration notification mail is transmitted from the customer apparatus. At step S11, the mail receiving unit 211 receives the registration notification mail from the customer apparatus 1 (step S11). The customer information processing unit 212 creates customer information based on the registration notification mail and stores the customer information in the management DB 13 (step S12). In addition, at the step S12, the monitor information processing unit 213 creates connection information based on the registration notification mail and stores the connection information in the management DB 23.

The monitor information processing unit 213 creates monitor information based on the connection information stored in the management DB 23 (step S13). Specifically, the monitor information processing unit 213 sets "0" to the regular connection state and sets "0" to the monitor suppression in the monitor information.

The incident creating unit 215 determines whether the apparatus ID included in the registration notification mail coincides with the apparatus ID included in the incident creating information in the incident creating information DB 24 (step S14). When the incident creating unit 215 determines that the apparatus ID included in the registration notification mail does not coincide with the apparatus ID included in the incident creating information in the incident creating information DB 24, the process ends. When the incident creating unit 215 determines that the apparatus ID included in the registration notification mail coincides with the apparatus ID included in the incident creating information in the incident creating information DB 24, the incident creating unit 215 sets "1" to the delete flag in the incident creating information corresponding to the apparatus ID in the incident creating information DB 24 (step S15) to prevent the incident from being issued (to suppress the incident from being issued).

Figure 11:
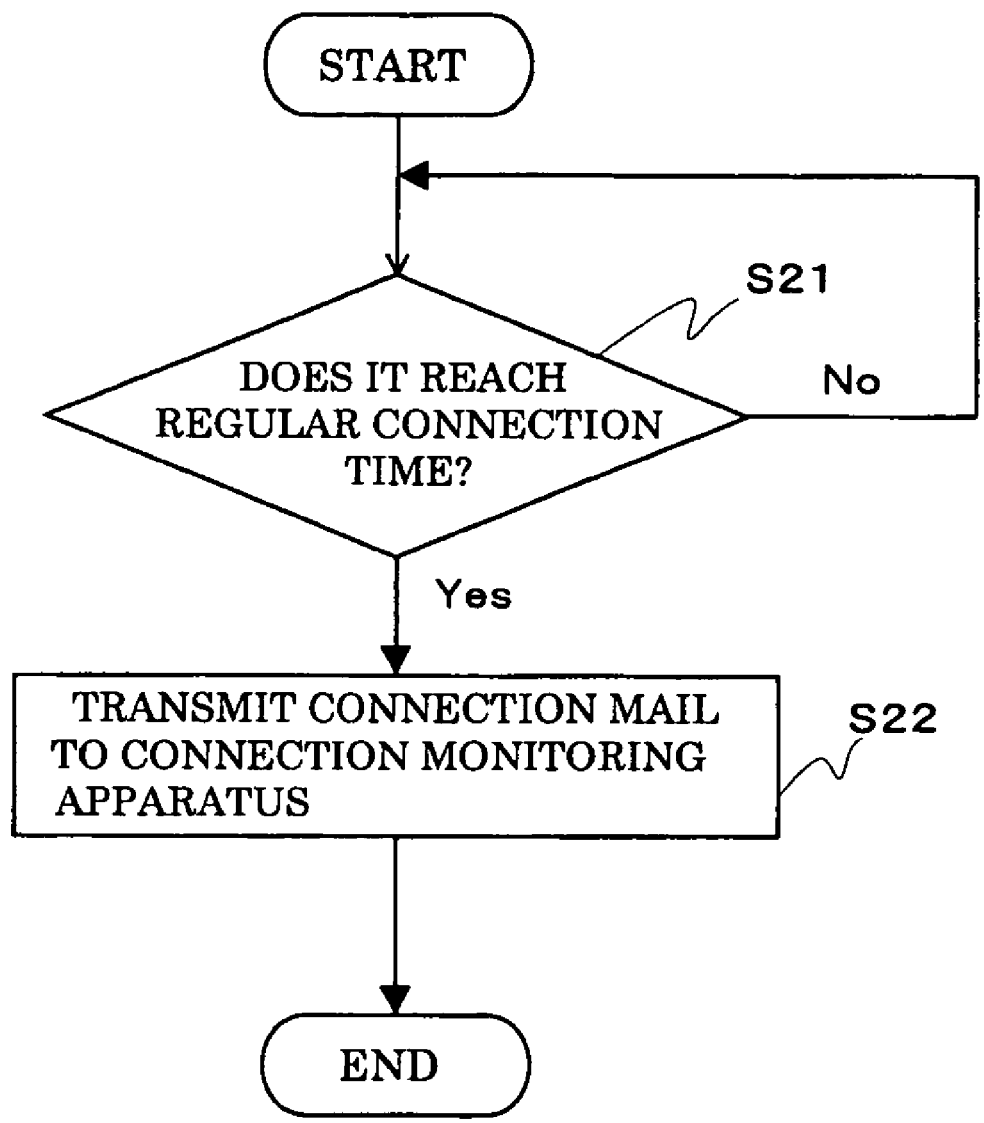
FIG. 11 is an example of a flow chart for transmission process of the connection mail.
Figure 12:
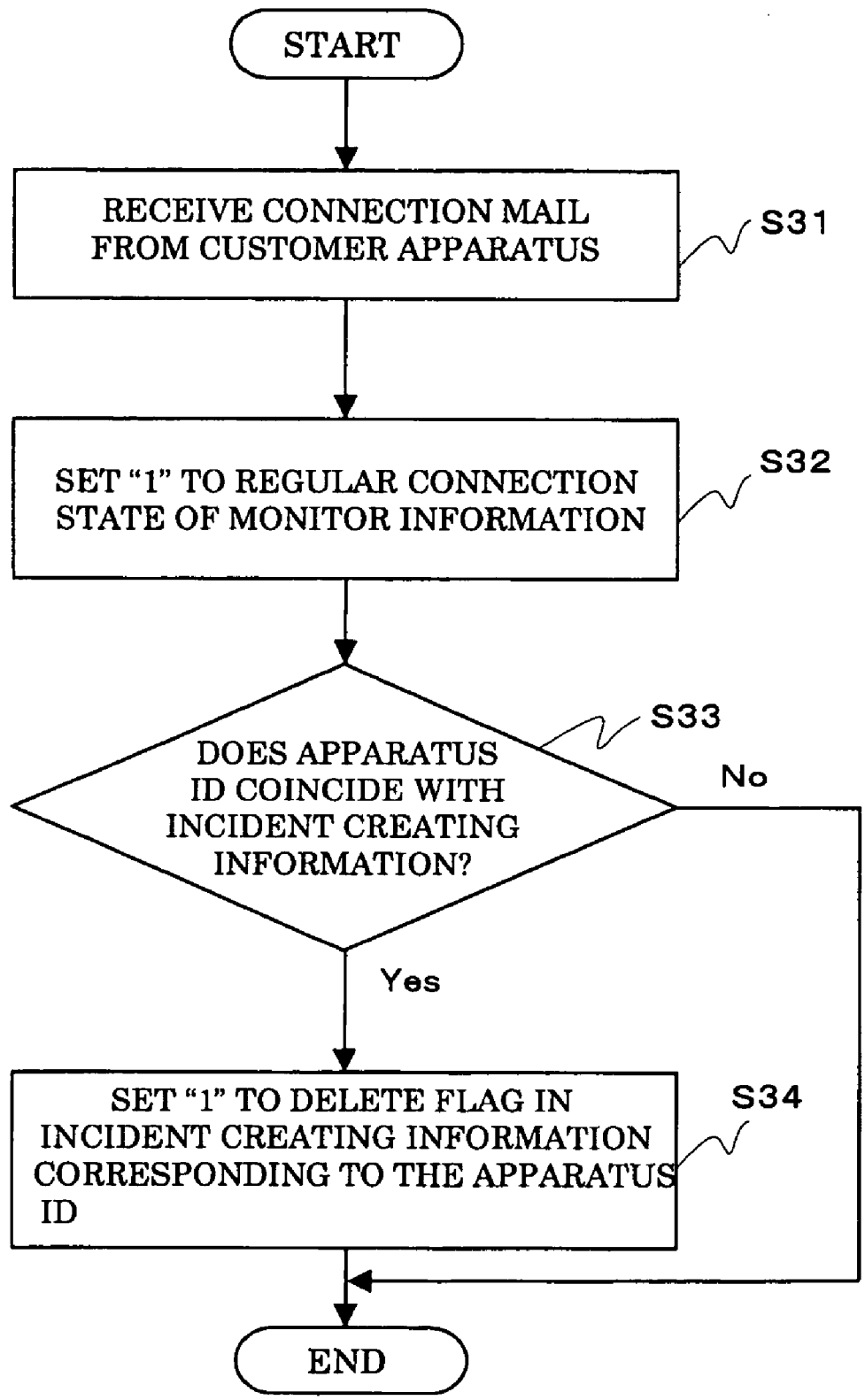
FIG. 12 is an example of a flow chart for reception process of the connection mail.

Referring to FIGS. 11 and 12, there is described below an example of the transmission and reception process of the connection mail executed by the connection monitoring system of the present embodiment. FIG. 11 is an example of a flow chart for transmission process of the connection mail by the customer apparatus.

At step S21, the regular connection processing unit 114 of the customer apparatus 1 determines whether it reaches the regular connection time corresponding to the customer apparatus 1 (step S21). When the regular connection processing unit 114 determines that it does not reach the regular connection time, the process returns to the step S21. When the regular connection processing unit 114 determines that it reaches the regular connection time, the regular connection processing unit 114 creates a connection mail including the apparatus ID of the customer apparatus 1, and the mail transmitting unit 115 transmits the connection mail to the connection monitoring apparatus 2 (step S22).

FIG. 12 is an example of a flow chart for reception process of the connection mail by the connection monitoring apparatus. The mail receiving unit 211 receives the connection mail from the customer apparatus 1 (step S31). The regular connection monitoring unit 214 sets the value "1" to the regular connection state of the monitor information in the management DB 23 (step S32). The incident creating unit 215 determines whether the apparatus ID included in the connection mail coincides with the apparatus ID included in the incident creating information in the incident creating information DB 24 (step S33). When the incident creating unit 215 determines that the apparatus ID included in the connection mail does not coincide with the apparatus ID included in the incident creating information in the incident creating information DB 24, the process ends. When the incident creating unit 215 determines that the apparatus ID included in the connection mail coincides with the apparatus ID included in the incident creating information in the incident creating information DB 24, the incident creating unit 215 sets "1" to the delete flag in the incident creating information corresponding to the apparatus ID in the incident creating information DB 24 (step S34) to prevent the incident from being issued (to suppress the incident from being issued).

Figure 13:
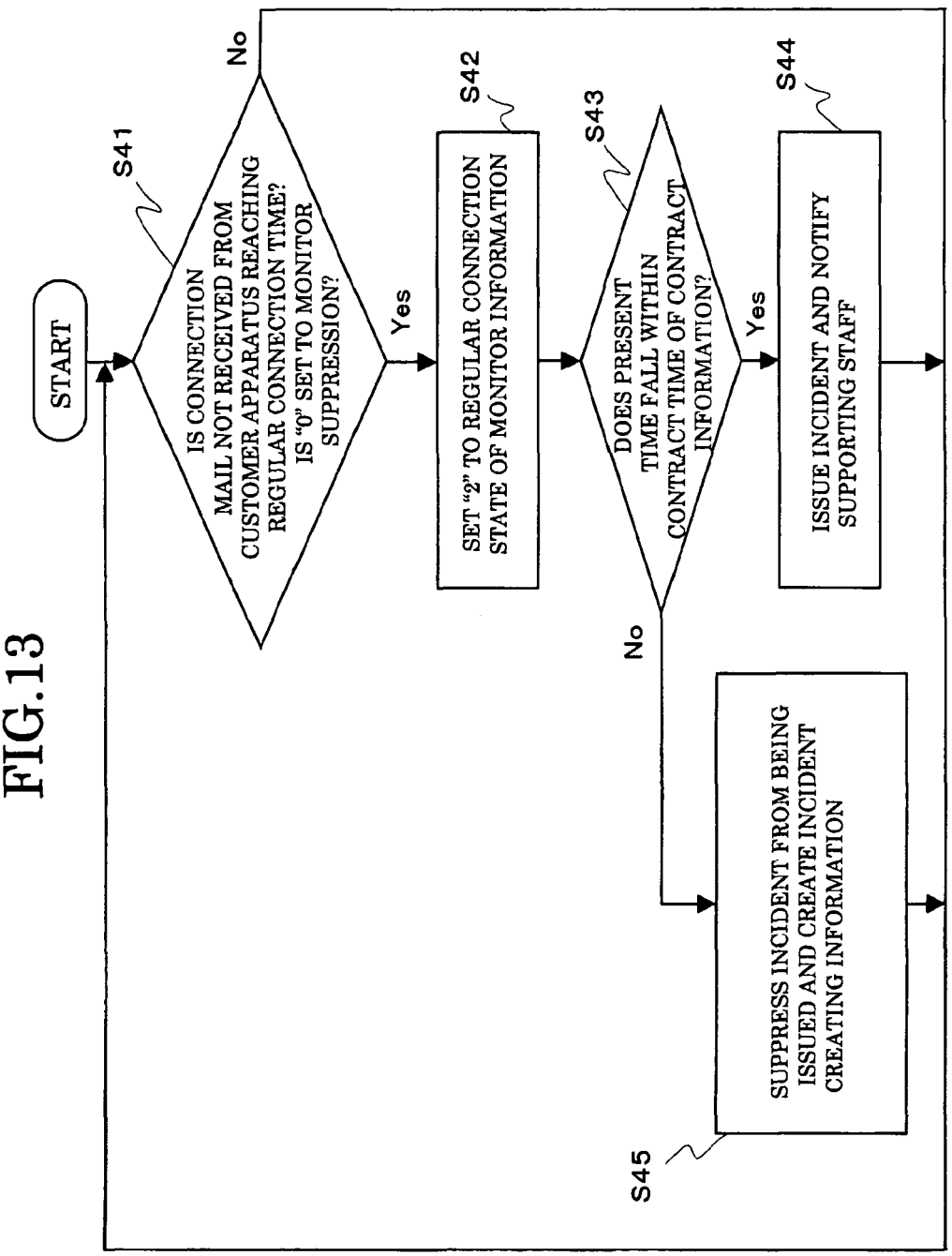
FIG. 13 is an example of a flow chart for the regular connection monitoring process.

FIG. 13 is an example of a flow chart for the regular connection monitoring process by the connection monitoring apparatus. The regular connection monitoring unit 214 of the connection monitoring apparatus 2 identifies the customer apparatus 1 reaching the regular connection time with reference to the regular connection schedule included in the monitor information in the management DB 23, and determines whether the connection mail is not received from the customer apparatus 1 and "0" is set to the monitor suppression included in the monitor information (step S41). When the regular connection monitoring unit 214 determines that the connection mail has been received or "0" has not been set to the monitor suppression included in the monitor information (for example, "1" has been set to the monitor suppression), the process returns to the step S41. When the regular connection monitoring unit 214 determines that the connection mail has not been received and "0" has been set to the monitor suppression included in the monitor information, the regular connection monitoring unit 214 determines that the regular connection time is up and sets "2" to the regular connection state of the monitor information (step S42).

The incident creating unit 215 determines whether the present time falls within the contract time set to the contract information with reference to the contract information corresponding to the customer apparatus 1 in the management DB 23 (step S43). When the incident creating unit 215 determines that the present time falls within the contract time set to the contract information, the regular connection monitoring unit 214 issues the incident and notifies the supporting staff (step S44). When the incident creating unit 215 determines that the present time does not fall within the contract time set to the contract information, the incident creating unit 215 instructs the regular connection monitoring unit 214 to suppress the incident from being issued and then creates the incident creating information (step S45), and the process returns to the step S41. Specifically, the incident creating unit 215 sets the apparatus ID of the customer apparatus 1 corresponding to the connection mail determined not to be received at the step S41 to the apparatus ID of the incident creating information, sets the present time to the date and time of regular connection time-out and sets "0" to the delete flag.

Figure 14:
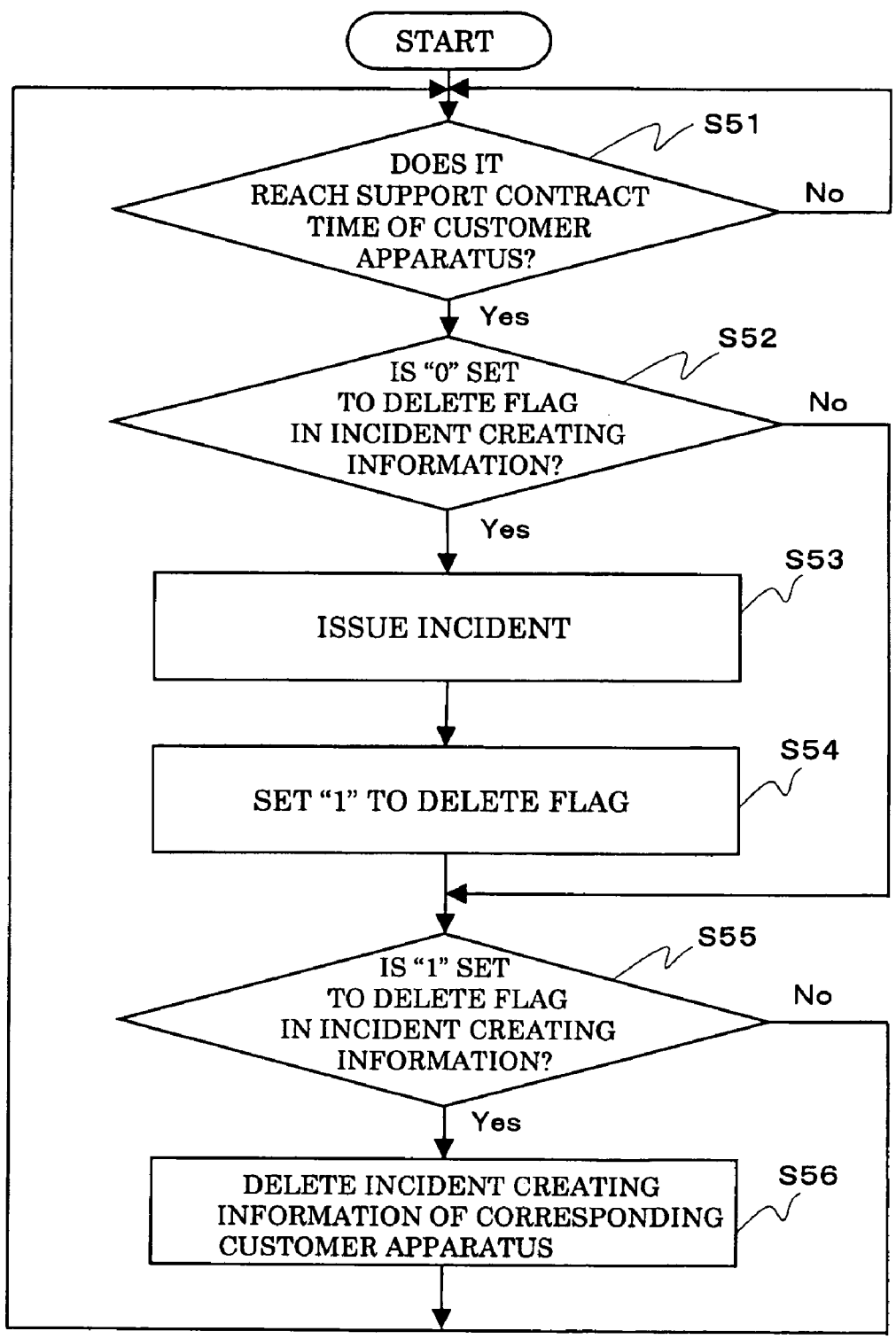
FIG. 14 is an example of a flow chart for the incident issuance process in the next support contract time.

FIG. 14 is an example of a flow chart for the incident issuance process in the next support contract time in the case where the incident is suppressed from being issued at the step S45 in FIG. 13. The incident creating unit 215 determines whether it reaches the support contract time of the customer apparatus 1 (step S51). When the incident creating unit 215 determines that it has not reached the support contract time, the process returns to the step S51.

When the incident creating unit 215 determines that it has reached the support contract time, the incident creating unit 215 determines whether "0" is set to the delete flag in the incident creating information (step S52). When the incident creating unit 215 determines that "0" is not set to the delete flag in the incident creating information, the process proceeds to step S55. When the incident creating unit 215 determines that "0" is set to the delete flag in the incident creating information, the regular connection monitoring unit 214 issues the incident (step S53) and sets "1" to the delete flag in the incident creating information (step S54).

The incident creating unit 215 determines whether "1" is set to the delete flag in the incident creating information (step S55). When the incident creating unit 215 determines that "1" is not set to the delete flag in the incident creating information, the process returns to the step S51. When the incident creating unit 215 determines whether "1" is set to the delete flag in the incident creating information, the incident creating unit 215 deletes the incident creating information corresponding to the customer apparatus 1 (step S56), and the process returns to the step S51.

Figure 15:
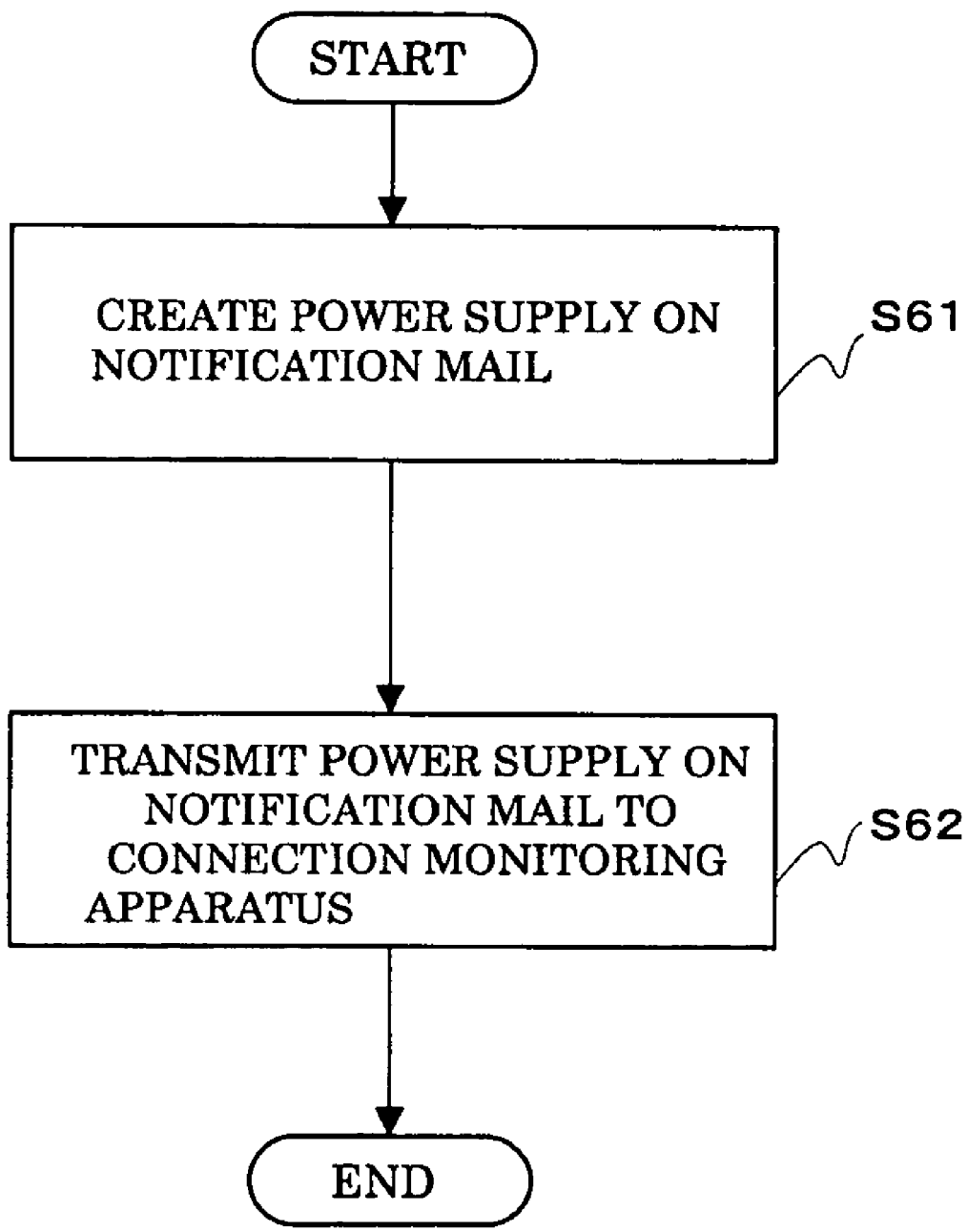
FIG. 15 is an example of a flow chart for the transmission process of the power supply ON notification mail.
Figure 16:
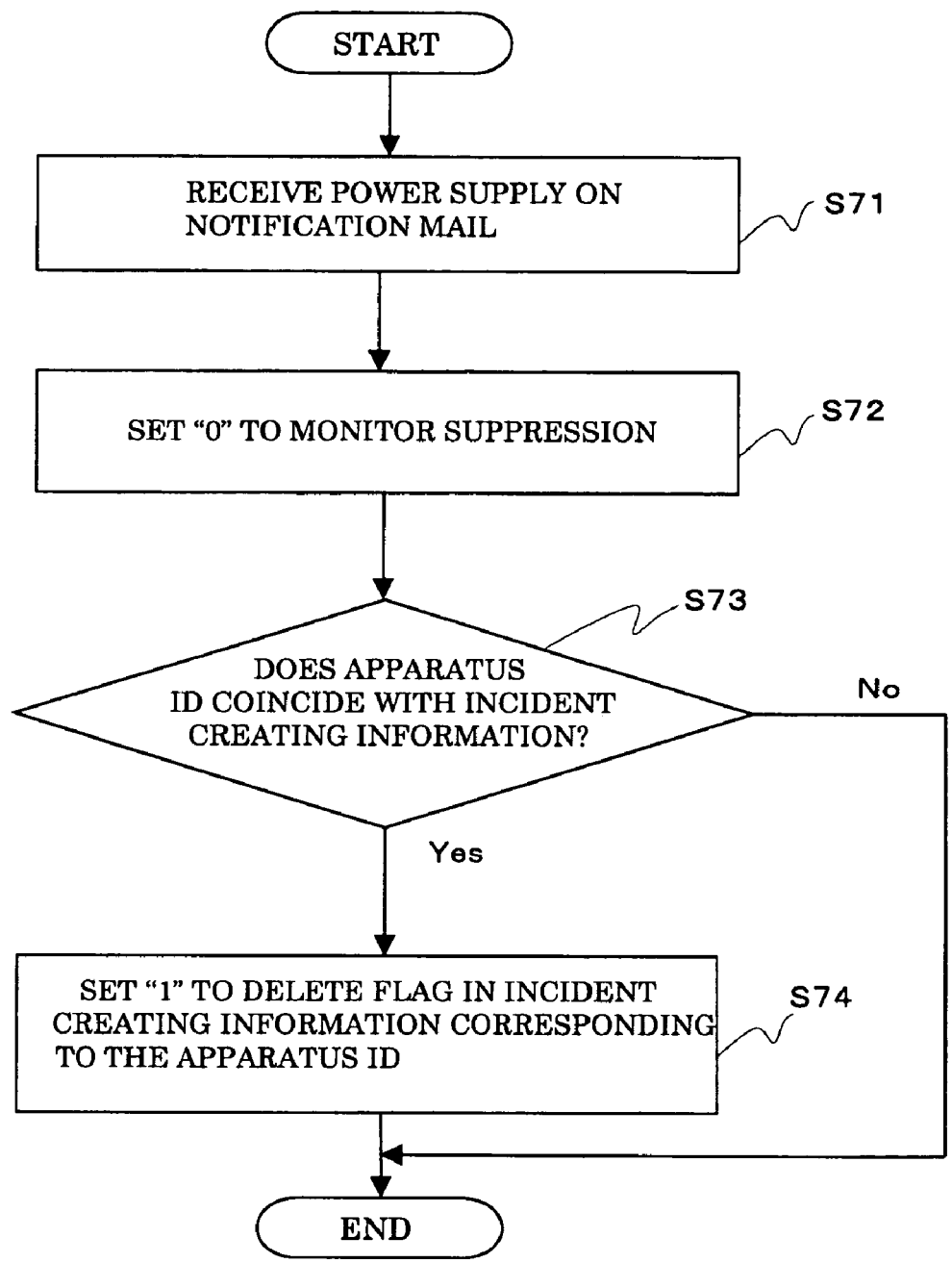
FIG. 16 is an example of a flow chart for the reception process of the power supply ON notification mail.

Referring to FIGS. 15 and 16, there is described below the suppression process of issuance of the incident in the case where the power supply ON notification mail is transmitted from the customer apparatus to the connection monitoring apparatus. FIG. 15 is an example of a flow chart for the transmission process of the power supply ON notification mail by the customer apparatus.

At step S61, turning on the power supply of the customer apparatus 1 causes the power supply ON processing unit 112 of the customer apparatus 1 to create the power supply ON notification mail including the apparatus ID of the customer apparatus 1 (step S61). The mail transmitting unit 115 transmits the power supply ON notification mail to the connection monitoring apparatus 2 (step S62).

FIG. 16 is an example of a flow chart for the reception process of the power supply ON notification mail by the connection monitoring apparatus. The mail receiving unit 211 receives the power supply ON notification mail from the customer apparatus 1 (step S71). The regular connection monitoring unit 214 sets "0" to the monitor suppression (step S72) to enable monitoring the state of connection between the connection monitoring apparatus 2 and the customer apparatus 1 (to release the suppression of monitor).

The incident creating unit 215 determines whether the apparatus ID included in the power supply ON notification mail coincides with the apparatus ID included in the incident creating information in the incident creating information DB 24 (step S73). When the incident creating unit 215 determines that the apparatus ID included in the power supply ON notification mail does not coincide with the apparatus ID included in the incident creating information in the incident creating information DB 24, the process ends. When the incident creating unit 215 determines that the apparatus ID included in the power supply ON notification mail coincides with the apparatus ID included in the incident creating information in the incident creating information DB 24, the incident creating unit 215 sets "1" to the delete flag in the incident creating information corresponding to the apparatus ID in the incident creating information DB 24 (step S74) to prevent the incident from being issued (to suppress the incident from being issued).

Figure 17:
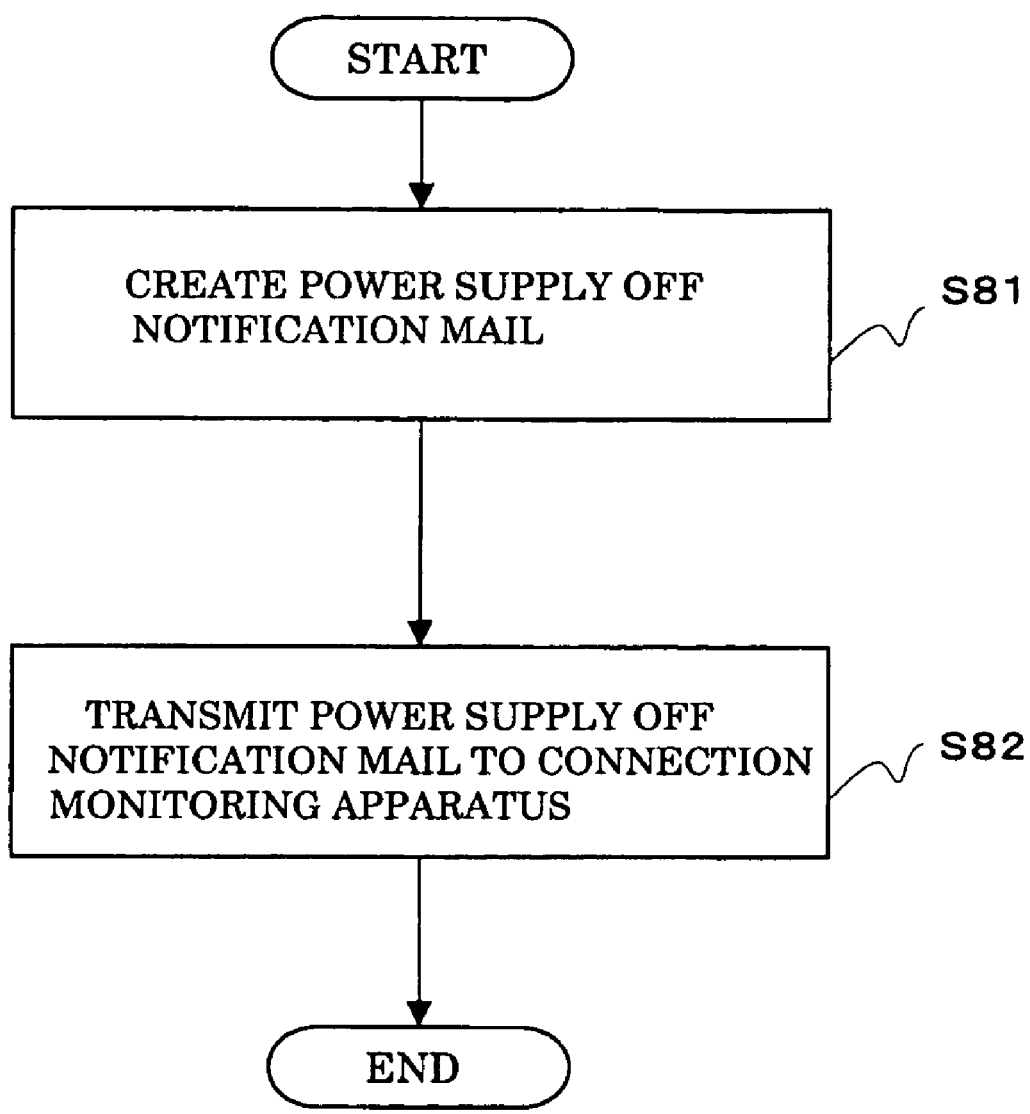
FIG. 17 is an example of a flow chart for the transmission process of the power supply OFF notification mail.
Figure 18:
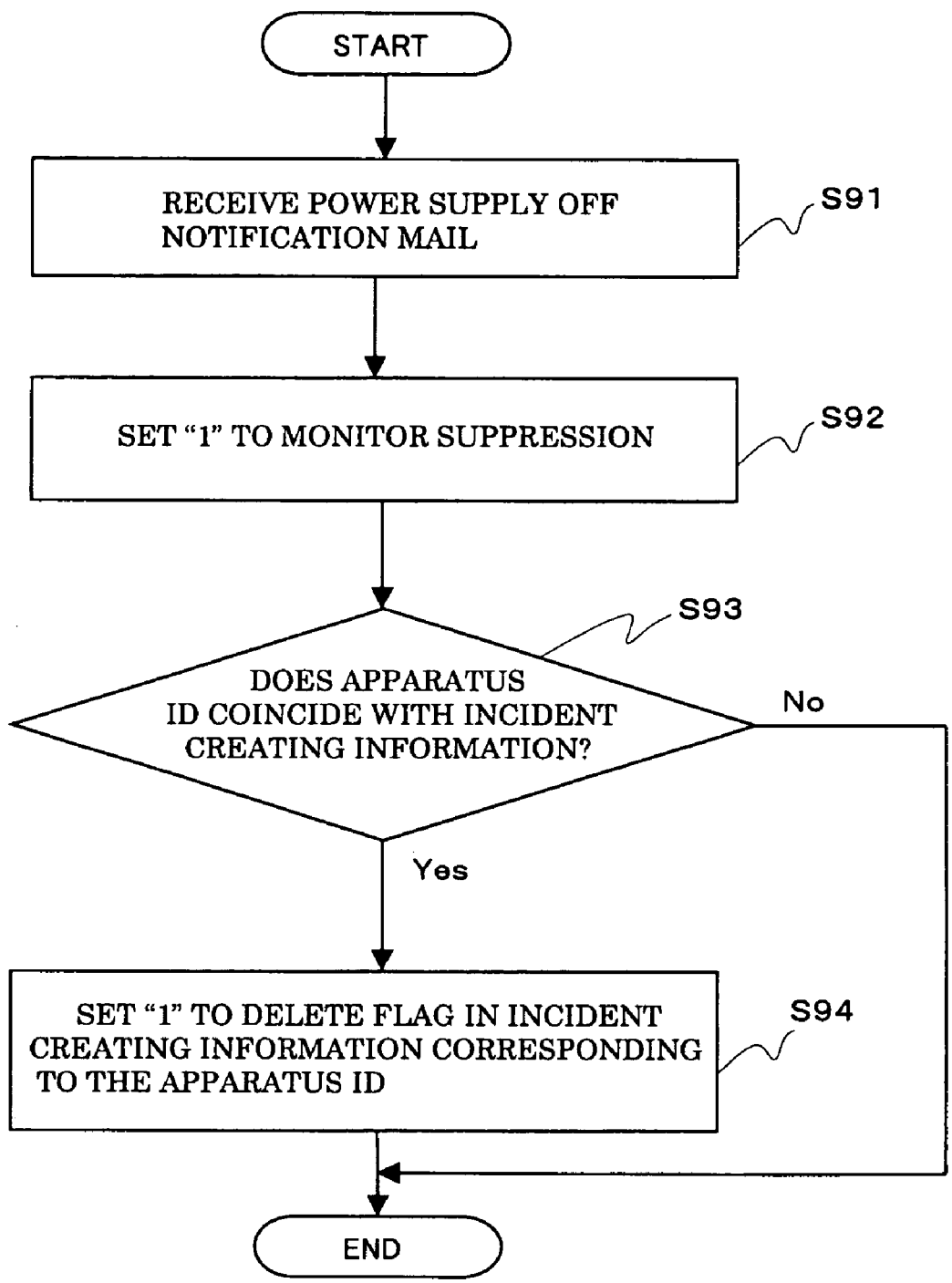
FIG. 18 is an example of a flow chart for the reception process of the power supply OFF notification mail.

Referring to FIGS. 17 and 18, there is described below the suppression process of issuance of the incident in the case where the power supply OFF notification mail is transmitted from the customer apparatus to the connection monitoring apparatus. FIG. 17 is an example of a flow chart for the transmission process of the power supply OFF notification mail by the customer apparatus.

At step S81, turning off the power supply of the customer apparatus 1 causes the power supply OFF processing unit 113 of the customer apparatus 1 to create the power supply OFF notification mail including the apparatus ID of the customer apparatus 1 (step S81). The mail transmitting unit 115 transmits the power supply OFF notification mail to the connection monitoring apparatus 2 (step S82).

FIG. 18 is an example of a flow chart for the reception process of the power supply OFF notification mail by the connection monitoring apparatus. The mail receiving unit 211 receives the power supply OFF notification mail from the customer apparatus 1 (step S91). The regular connection monitoring unit 214 sets "1" to the monitor suppression (step S92) to prevent monitoring the state of connection between where the connection monitoring apparatus 2 is communicatively connected to the customer apparatus 1 (to suppress monitor).

The incident creating unit 215 determines whether the apparatus ID included in the power supply OFF notification mail coincides with the apparatus ID included in the incident creating information in the incident creating information DB 24 (step S93). When the incident creating unit 215 determines that the apparatus ID included in the power supply OFF notification mail does not coincide with the apparatus ID included in the incident creating information in the incident creating information DB 24, the process ends. When the incident creating unit 215 determines that the apparatus ID included in the power supply OFF notification mail coincides with the apparatus ID included in the incident creating information in the incident creating information DB 24, the incident creating unit 215 sets "1" to the delete flag in the incident creating information corresponding to the apparatus ID in the incident creating information DB 24 (step S94) to prevent the incident from being issued (to suppress the incident from being issued).

FIG. 19 is a block diagram describing a detailed example of the suppression process of issuance of the incident by the connection monitoring system of the present embodiment. The connection monitoring apparatus 2 holds information such as a regular connection schedule by the customer apparatus, connection state and contract time. The regular connection schedule is included in the monitor information. The connection state represents the state of communicative connection between the customer apparatus and the connection monitoring apparatus 2. The contract time represents the support contract time of the customer apparatus included in the contract information.

The connection monitoring apparatus 2 monitors whether the connection mail arrives from each customer apparatus at a regular connection time. For example, as indicated by #1 in FIG. 19, when the connection mail does not arrive from a customer apparatus A at a regular connection time of two o'clock, the connection monitoring apparatus 2 determines that a state of connection between the connection monitoring apparatus 2 and the customer apparatus A is NG, namely, the connection monitoring apparatus 2 is not communicatively connected to the customer apparatus A, and issues the incident (connection fault notification) corresponding to the customer apparatus A (refer to #2 in FIG. 19). The supporting staff calls the customer of the customer apparatus A based on the content of the incident to confirm the state thereof (refer to #3 in FIG. 19).

As indicated by #4 and #5 in FIG. 19, when the connection mails do not arrive from customer apparatus C and D at a regular connection time, the connection monitoring apparatus 2 determines that a state of communicative connection between the connection monitoring apparatus 2 and the customer apparatus C, and a state of communicative connection between the connection monitoring apparatus 2 and the customer apparatus D are NG. The regular connection time (4 o'clock, every day) corresponding to the customer apparatus C does not fall within a support contract time of nine o'clock to nineteen o'clock. Therefore, the connection monitoring apparatus 2 suppresses the issuance of the incident corresponding to the customer apparatus C and issues the incident corresponding to the customer apparatus C at the next support contract time of the customer apparatus C (refer to #6 in FIG. 19). Then, the supporting staff calls the customer of the customer apparatus C based on the content of the incident to confirm the state thereof (refer to #7 in FIG. 19).

The regular connection time (five o'clock, every day) corresponding to the customer apparatus D does not fall within a support contract time of nine o'clock to nineteen o'clock. Therefore, the connection monitoring apparatus 2 suppresses the issuance of the incident corresponding to the customer apparatus D and issues the incident corresponding to the customer apparatus D at the next support contract time of the customer apparatus D. When the customer apparatus D transmits the power supply ON notification mail to the connection monitoring apparatus 2 at eight o'clock that is a time before the next support contract time of the customer apparatus D starts (refer to #8 in FIG. 19), the connection monitoring apparatus 2 determines that the state of communicative connection between the connection monitoring apparatus 2 and the customer apparatus D is OK, namely, the connection monitoring apparatus 2 is communicatively connected to the customer apparatus D (refer to #9 in FIG. 19), and suppresses the issuance of the incidence corresponding to the customer apparatus D scheduled to be issued at the next support contract time.

It is understood that the connection monitoring apparatus of an embodiment of the present invention is a connection monitoring apparatus for monitoring a communicative connection between the connection monitoring apparatus and a customer apparatus. The connection monitoring apparatus comprises a connection fault notification issuing unit for determining whether the connection monitoring apparatus is communicatively connected to the customer apparatus at a regular connection time, and issuing a connection fault notification when the connection monitoring apparatus is not communicatively connected to the customer apparatus at the regular connection time and the present time falls within the support contract time of a customer. The connection fault notification issuing unit suppresses the connection fault notification from being issued when the connection monitoring apparatus is not communicatively connected to the customer apparatus at the regular connection time and the present time does not fall within the support contract time of the customer, and issues the connection fault notification at the next support contract time of the customer.

It is also understood that the connection monitoring system of an embodiment of the present invention is a connection monitoring system including a customer apparatus and a connection monitoring apparatus for monitoring a communicative connection between the connection monitoring apparatus and the customer apparatus. The connection monitoring apparatus comprises a connection fault notification issuing unit for determining whether the connection monitoring apparatus is communicatively connected to the customer apparatus at a regular connection time, and issuing a connection fault notification when the connection monitoring apparatus is not communicatively connected to the customer apparatus at the regular connection time and the present time falls within the support contract time of a customer. The connection fault notification issuing unit suppresses the connection fault notification from being issued when the connection monitoring apparatus is not communicatively connected to the customer apparatus at the regular connection time and the present time does not fall within the support contract time of the customer, and issues the connection fault notification at the next support contract time of the customer.

In the connection monitoring method, the connection monitoring apparatus and the connection monitoring system of an embodiment of the present invention, the connection monitoring apparatus for monitoring the communication connection with the customer apparatus determines whether the communication connection with the customer apparatus could be confirmed at the regular connection time, suppresses the issuance of the connection fault notification when the communication connection with the customer apparatus could not be confirmed at the regular connection time and the present time does not fall within the support contract time for the customer, and issues the connection fault notification during the next support contract time for the customer.

Therefore, according to the connection monitoring method, the connection monitoring apparatus and the connection monitoring system, the issuance of the connection fault notification can be suppressed outside the support contract time. This eliminates the need for the supporting staff to confirm the connection fault notification outside the support contract time, reducing the man-hour of the supporting staff.

All examples and conditional language recited herein are intended for pedagogical purpose to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A connection monitoring method for monitoring a communicative connection between a connection monitoring apparatus and a customer apparatus, the method comprising:
   determining, in the connection monitoring apparatus, whether the connection monitoring apparatus is communicatively connected to the customer apparatus at a specified connection time;
   issuing a connection fault notification when the connection monitoring apparatus is not communicatively connected to the customer apparatus at the specified connection time and the present time falls within a support contract period of the customer and
   suppressing the connection fault notification from being issued when the present time does not fall within the support contract period of the customer; and
   issuing, in the connection monitoring apparatus, the connection fault notification during the next support contract period of the customer.

2. The connection monitoring method according to claim 1, wherein, in the connection monitoring apparatus, when data were received from the customer apparatus before the next support contract period of the customer starts, deleting the connection fault notification suppressed from being issued.

3. A connection monitoring apparatus for monitoring a communicative connection between the connection monitoring apparatus and a customer apparatus, the apparatus comprising:
   a connection fault notification issuing unit for determining whether the connection monitoring apparatus is communicatively connected to the customer apparatus at a specified connection time, and issuing a connection fault notification when the connection monitoring apparatus is not communicatively connected to the customer apparatus at the specified connection time and the present time falls within a support contract period of the customer, and
   wherein the connection fault notification issuing unit suppresses the connection fault notification from being issued when the present time does not fall within the support contract period of the customer, and issues the connection fault notification during the next support contract period of the customer.

4. The connection monitoring apparatus according to claim 3, wherein, when data were received from the customer apparatus before the next support contract period of the customer starts, the connection fault notification unit deletes the connection fault notification suppressed from being issued.

5. A connection monitoring system including a customer apparatus and a connection monitoring apparatus for monitoring a communicative connection between the connection monitoring apparatus and the customer apparatus, wherein the connection monitoring apparatus comprises:

a connection fault notification issuing unit for determining whether the connection monitoring apparatus is communicatively connected to the customer apparatus at a specified connection time, and issuing a connection fault notification when the connection monitoring apparatus is not communicatively connected to the customer apparatus at the specified connection time and the present time falls within a support contract period of the customer, wherein the connection fault notification issuing unit suppresses the connection fault notification from being issued when the present time does not fall within the support contract period of the customer, and issues the connection fault notification during the next support contract period of the customer.

* * * * *